United States Patent
Viken

[11] Patent Number: 6,164,346
[45] Date of Patent: Dec. 26, 2000

[54] DUAL CHAMBER FLUID EXCHANGE APPARATUS

[76] Inventor: James P. Viken, 9890 Crestwood Ter., Eden Prairie, Minn.

[21] Appl. No.: 09/235,562

[22] Filed: Jan. 22, 1999

Related U.S. Application Data

[60] Provisional application No. 60/072,403, Jan. 23, 1998, and provisional application No. 60/072,400, Jan. 23, 1998.

[51] Int. Cl.$^7$ ..................................................... F16N 33/00
[52] U.S. Cl. ................................ 141/98; 141/65; 141/67; 184/1.5
[58] Field of Search .................................. 141/59, 65, 67, 141/94, 95, 98; 222/386.5, 389; 184/1.5, 106; 128/205.14, 205.15, 205.16; 417/374, 392, 472, 473, 521

[56] References Cited

U.S. PATENT DOCUMENTS

| | | | |
|---|---|---|---|
| 2,951,450 | 9/1960 | Fisher | 417/273 |
| 5,628,305 | 5/1997 | Melker | 128/202.29 |
| 5,871,068 | 2/1999 | Selby . | |

Primary Examiner—Henry J. Recla
Assistant Examiner—Peter deVore
Attorney, Agent, or Firm—Larkin, Hoffman, Daly & Lindgren, Ltd.; John F. Klos, Esq.

[57] ABSTRACT

A first structure has a flexible outer wall system defining a first vessel. The first vessel is used to contain one or more fluids and is expandable and compressible to one or more states dependent on a volume of one or more fluids in the first vessel. A second structure has a flexible outer wall system defining a second vessel. The second vessel is used to contain one or more fluids and be expandable and compressible to one or more states dependent on a volume of one or more fluids in the second vessel. A first conduit assembly is used for communication of a first fluid to or from one of the first structure and the second structure. A second conduit assembly is used for communication of a second fluid to or from the other of the first structure and the second structure. The first structure and the second structure may operatively cooperate with one another such that a change in a volume of the first vessel is proportional to a change in a volume of the second vessel.

19 Claims, 2 Drawing Sheets

DUAL CHAMBER FLUID EXCHANGE APPARATUS

CROSS REFERENCE TO RELATED APPLICATIONS

This application claims the benefit of priority pursuant to 35 U.S.C. §119(e)(1) from the provisional patent application filed pursuant to 35 U.S.C. §111(b): as Ser. No. 60/072,403 on Jan. 23, 1998 and Ser. No. 60/072,400 on Jan. 23, 1998.

BACKGROUND OF THE INVENTION

The present invention relates to an improved fluid exchange system and, more particularly, to an expandable and compressible multi-vessel assembly therein for fluid exchange.

U.S. Pat. No. 5,318,080, entitled, *Transmission Fluid Exchanger*, discloses fluid changing in an automatic transmission by opening the cooler line and draining used fluid, at the flow of normal circulation, out of the cooler line from the transmission into a drain receptacle for receiving used fluid and simultaneous supplying fresh fluid, into the cooler return line to the transmission at a similar controlled rate that is equal to the rate of flow of the used fluid into the drain receptacle.

U.S. Pat. No. 5,472,064, entitled, *Total Fluid Exchange System for Automatic Transmissions*, discloses a system for providing total fluid exchange for an automatic transmission which interconnects with the transmission's opened cooling circuit to deliver new, fresh fluid to the transmission while simultaneously extracting the spent, used fluid. The system provides a means of quick and random interconnection to an opened cooling circuit and means of identifying and aligning direction of flow in such cooling circuit. The system may accurately calibrate and regulate the rate that fresh fluid will be introduced into the transmission to match the flow rate at which the used fluid is extracted. Quick coupling devices are used for ease and speed of interconnection of the system into operative position, for quick removal of the system and for reconnection of the opened cooling circuit for ease of repeat, periodic servicing by the system as a regular maintenance procedure.

All documents cited herein, including the foregoing, are incorporated herein by reference in their entireties for all purposes.

SUMMARY OF THE INVENTION

Fluid exchange devices currently available are generally costly and often difficult to construct and assemble. The fluid exchange system of the present invention may advantageously be constructed of expandable and compressible structures having oil resistance properties. An example of the type of structure used would be similar to commercially-available pleated air shock bag assemblies used on some 18 wheel over-the-road trucks.

The components of the present invention are generally readily available, inexpensive, and easy to affix together within a support frame. The present invention incorporates two pleated bags for fluid reservoirs. The present invention is unique from other fluid exchange systems, for example, the pleated bags advantageously provide their own sidewall support and may be secured to a support frame on two opposing ends. Also, the present invention advantageously provides fluid containment without a surrounding external structure other than a support frame.

In sum, the invention relates to a fluid changing apparatus including a first structure with an at least partially flexible outer wall system defining a first vessel. The first vessel is adapted to contain one or more fluids and be expandable and compressible to one or more states dependent on a volume of one or more fluids in the first vessel. A second structure with an at least partially flexible outer wall system defines a second vessel. The second vessel is adapted to contain one or more fluids and be expandable and compressible to one or more states dependent on a volume of one or more fluids in the second vessel. A first conduit assembly is used for communication of a first fluid to or from one of the first structure and the second structure and a second conduit assembly is used for communication of a second fluid to or from the other of the first structure and the second structure. The fluid changing apparatus may further include a frame and the first structure and the second structure may form an assembly and be further operatively connected to the frame. A first end of the first structure and a second end of the second structure may be each connected to a separate portion of a frame to define a distance between the first end of the first structure and the second end of the second structure. The distance between the first end of the first structure and the second end of the second structure may be adapted to be adjustable. A second end of the first structure and a first end of the second structure may be substantially adjacent and separated by one or more members. The first structure and the second structure may be operatively connected. The first structure and the second structure may be adapted to contain a fluid under pressure. The first structure may be used for generally fresh fluid. The second structure may be for generally used fluid. The fluid changing apparatus may further include a first volume of one or more fluids in the first structure and a second volume of one or more fluids in the second structure whereby a sum of the first volume of one or more fluids and the second volume of one or more fluids is about constant during operation of the fluid changing apparatus. During operation of the fluid changing apparatus, an increase in an amount of one or more fluids in the second structure may correspond to a decrease in an amount of one or more fluids in the first structure. During operation of the fluid changing apparatus, a change in a volume of fluid in one of the first structure and the second structure may correspond to an opposite change in a volume of fluid in the other of the first structure and the second structure. The first structure and the second structure may be accordion-like or bellow-like. The first structure and the second structure may be substantially inflexible in a radial direction. The first structure and the second structure may have a limited longitudinal displacement. The first structure and the second structure may be limited to expansion and compression in substantially one longitudinal direction. The first structure and the second structure may be made of a substantially flexible material adapted to contain fluid under pressure. The first structure and the second structure may be adapted to form variable shaped fluid containment vessels having a range of volumes. The first conduit assembly may be used to carry generally fresh fluid from a generally fresh fluid structure to a transmission fluid circulation circuit. The second conduit assembly may be used to carry used fluid from a transmission fluid circulation circuit to a used fluid structure. A volume of fluid may be introduced into a circuit from the first structure which is about equal to the volume of fluid introduced into the second structure from the circuit.

The invention also relates to a fluid changing apparatus including a first structure with an at least partially flexible outer wall which forms a first vessel adapted to have a range of volumes. The first structure is adapted to expand to one or more states when filled with one or more fluids and is adapted to compress to one or more states when one or more fluids are removed. A second structure with an at least partially flexible outer wall forms a second vessel adapted to have a range of volumes. The second structure is adapted to expand to one or more states when filled with one or more fluids and adapted to compress to one or more states one or more fluids are removed. The first structure and the second structure operatively cooperate with one another such that a change in a volume of the first vessel is proportional to a change in a volume of the second vessel. The fluid changing apparatus may further include a first conduit assembly fluidly connected to one of the first vessel and the second vessel and a second conduit assembly fluidly connected to the other of the one of the first vessel and the second vessel.

Still other objects and advantages of the present invention and methods of construction of the same will become readily apparent to those skilled in the art from the following detailed description, wherein only the preferred embodiments are shown and described, simply by way of illustration of the best mode contemplated of carrying out the invention. As will be realized, the invention is capable of other and different embodiments and methods of construction, and its several details are capable of modification in various obvious respects, all without departing from the invention. Accordingly, the drawing and description are to be regarded as illustrative in nature, and not as restrictive.

DETAILED DESCRIPTION OF THE PREFERRED EMBODIMENTS

Figure 1:
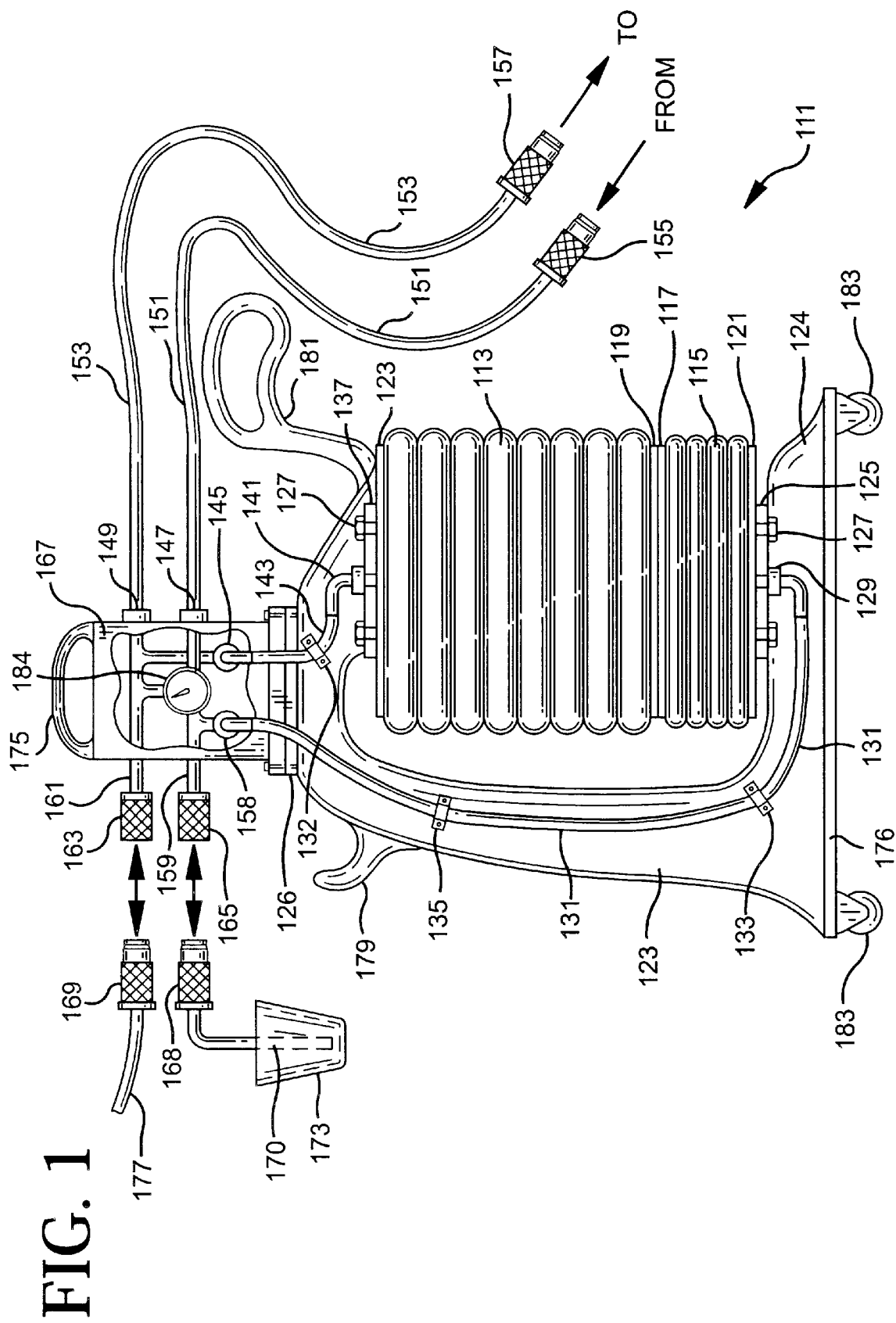
FIG. 1 is a perspective view of a dual chamber fluid exchange apparatus.

FIG. 1 illustrates two structures, each with pleats, secured together to form a dual structure assembly 111. The assembly 111 is affixed as a unit inside a support frame 124. The top and the bottom of assembly 111 are each connected to a portion of the support frame 124. Assembly 111 includes a fresh fluid supply structure 113 and a used fluid receiving structure 115. Structure 115 is for receiving used fluid and used fluid diluted with fresh fluid from the transmission. Structure 113 has a rigid outside support plate 123 at its top side and a rigid outside support plate 119 at its lower side. Structure 115 has a rigid outside support plate 117 at its top side and a rigid outside support plate 121 at its lower side.

Structure 113 includes a connector fitting 141 to connect a hose 143 for delivering fresh fluid. Hose 143 is connected to connector 145 which is further connected to fresh fluid passages of a fluid manifold assembly 167. Fluid manifold assembly 167 includes fresh fluid passages and used and diluted fluid passages. Manifold 167 includes a handle 175. Structure 115 includes a connector fitting 129 which is connected to a hose 131 for delivery of used and diluted used fluid to manifold 167 through a connector 158. Connector 158 is connected to the passages which carry used and diluted used fluid of manifold 167. Structures 113, 115 are preferably made of a petroleum resistant material such as EPDM, nitrile, etc.

Support frame 124 has a top base plate 137 to which support plate 123 is affixed by use of the bolts 127. Support frame 124 has a bottom base plate 125 to which support plate 121 is affixed by use of the bolts 127. Support frame 124 has a main base plate 176 to which a set of four caster wheels 183 are affixed. Support frame 124 has a hose rack member 179 affixed to it and a combination hose rack member /handle assembly 181 also affixed to it. Support frame 124 has three hose clamps riveted to it, a hose clamp 133 and a hose clamp 135 affixing hose 131, and a hose clamp 132 affixing hose 143. A pressure gauge 184 with a radially reading indictor indices in pounds per square inch is connected to the fresh fluid passages of manifold 167.

A hose 153 for delivery of fresh fluid to the return line side of the cooling circuit of the transmission is connected to the fresh fluid passages of manifold 167 on one end at port 149, and to a quick connect female receiver 157 at the other end. A hose 151 for delivery of used and diluted used fluid from the outlet line side of the cooling circuit of the transmission is connected to the used and diluted used fluid passages of manifold 167 on one end at port 147, and to a quick connect female receiver 155 at the other end. A conduit 161 connects a quick connect nipple 163 to the fresh fluid passages of manifold 167 and a conduit 159 connects a quick connect nipple 165 to the used and diluted used fluid passages of manifold 167.

A quick connect female receiver 168 is releasably connectable to nipple 165 and is connected to a flexible hose 171 for discharge of used and diluted used fluid to communicate with a receiver bucket 173 for used and diluted used fluid. A quick connect female receiver 169 is releasable connectable to nipple 163 and is connected to fresh fluid forced feed supply hose 177.

Prior to fluid exchange, structure 113 is generally fully charged with fresh fluid and in a fully longitudinally expanded state, and structure 115 is generally empty and in a fully longitudinally compressed state. When a fluid exchange procedure with a transmission circuit is completed, structure 113 is generally empty of fresh fluid and is in a longitudinally compressed state, and structure 115 is generally fully charged with used and diluted used fluid and in a longitudinally expanded state.

To begin the fluid exchange procedure, interconnection of the fluid exchange apparatus is made to the opened cooling circuit of an automatic transmission as illustrated in FIG. 1. Fresh fluid delivery hose 157 is connected to the return line side of the cooling circuit to deliver fresh fluid thereto. Used and diluted fluid delivery hose 155 is connected to the outlet side of the cooling circuit to receive fluid therefrom. The operator starts the vehicle to render its transmission operative. Pressure gauge 184 provides a positive pressure reading indicating fresh fluid is being introduced into the transmission by the exchanger to be exchanged for used fluid being discharged by the transmission into the exchanger, and this is also indicated by a visible shrinking of structure 113 and a visible expansion of structure 115. The fluid exchange is continued until structure 115 reaches its maximum expansion and structure 113 is compressed and reduced to its minimum size. Next, the operator turns off the vehicle engine to render the transmission inoperative. The fluid exchange system is then disconnected from the cooling circuit of the transmission, and that cooling circuit is reconnected.

After a fluid exchange procedure, structure 113 is recharged with fresh fluid and structure 115 is emptied at the same time by connecting quick connect female receiver 168 with its hose 171 to nipple 159 and simultaneously connecting the quick connect female receiver 169 to provide access to a forced feeder fresh fluid supply hose 177. This connection pumps fresh fluid through connector and hose 143, through connector 145 and into structure 113 through manifold 167 and simultaneously delivers used and diluted used fluid out of structure 115, through connector 129, through hose 131, into connector 158, through manifold 167 and into hose 171 to be discharged into bucket 173. Once the used and diluted fluid stops flowing into bucket 173, and once structure 113 stops expanding and structure 115 stops compressing, the operator disconnects quick connect female receivers 169 and 168. Thereafter, the system is generally ready to exchange its new fluid for the used fluid of a transmission to which it is connected.

Figure 2:
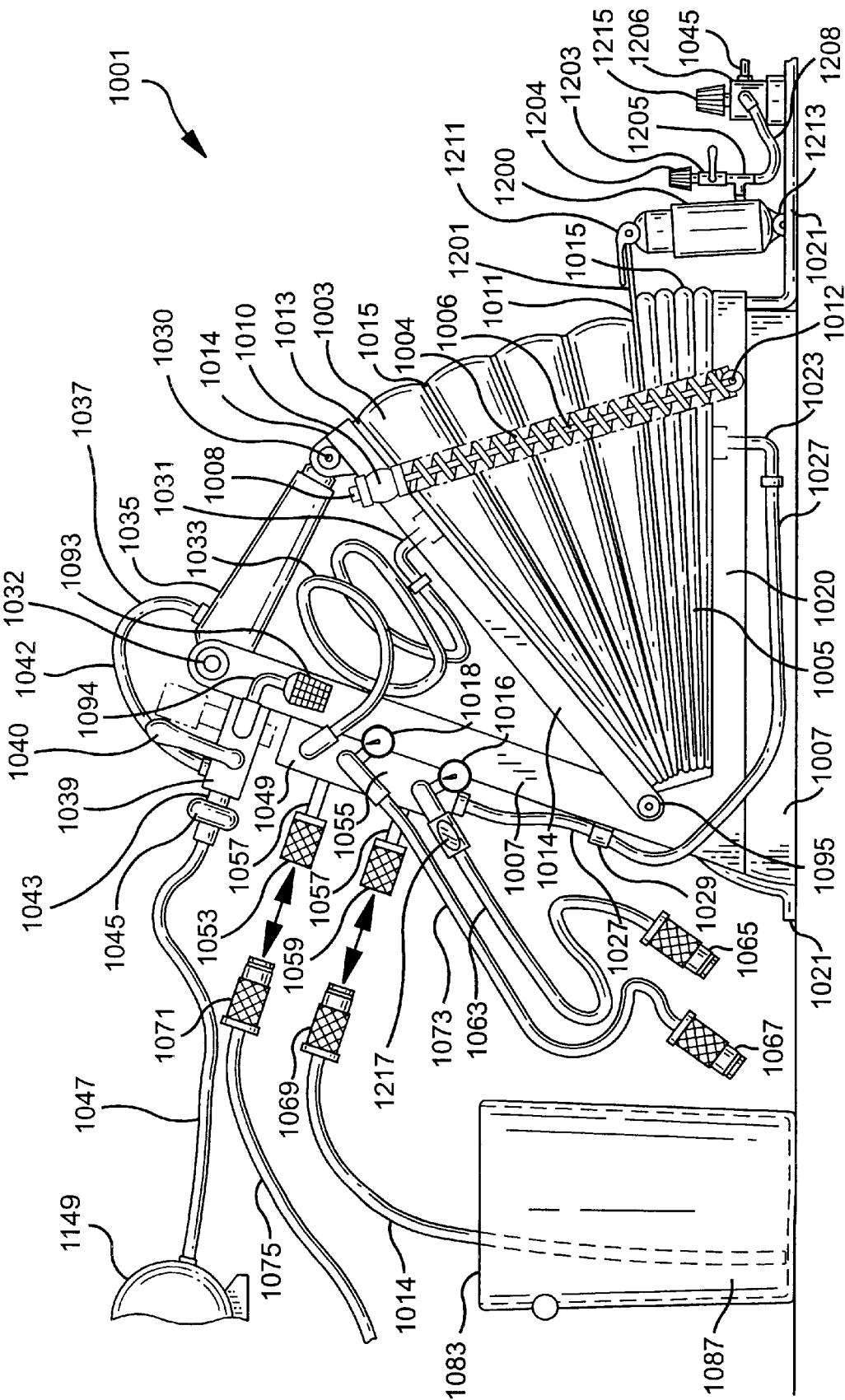
FIG. 2 is a perspective view of a second embodiment of a dual chamber fluid exchange apparatus.

Reference is made to FIG. 2 which illustrates another embodiment of the invention. FIG. 2 depicts an accordion type mechanically assisted fluid exchanger having a dual chamber assembly 1001, which is constructed of fluid tight, nitrile impregnated nylon fabric. Assembly 1001 is molded into an accordion shape. A set of nylon reinforcing cable 1015 are molded into the pleats. Assembly 1001 has an integral fresh fluid supply structure 1003 and a rigid outside support plate 1013, which is a steel plate integrally vulcanized into the assembly 1001. Assembly 1001 has an integral used fluid receiver structure 1005 and a rigid outside support plate 1020, which is a steel plate integrally vulcanized into the assembly 1001. Assembly 1001 has a rigid middle support plate 1011 which is a steel plate integrally vulcanized into the assembly 1001 and separating the structures 1003, 1005.

Support plate 1013 is affixed to a pivot frame assembly 1014, which itself is fixed to a main apparatus frame 1007 at a pivot pin assembly 1095. A dual spring assembly 1004, one per side of apparatus is fixed between pivot frame assembly 1014 and main frame 1007 by a rod/spring guide 1006 which is connected but pivotable at main frame 1007 by a pivot connector 1012 at the bottom and a slide through pivot ring 1010 at the top. Rod/spring guide 1006 is connected with a connector ring 1008. A leg/support 1021 is welded or attached to main frame 1007 on each side of the assembly 1001.

A main air ram 1035 is affixed at its bottom side to pivot frame assembly 1030 and at its top side at pivot pin assembly 1032. Main air ram 1035 is connected to a compressed air manifold 1039 by a shielded compressed air supply hose 1042. Manifold 1039 has a quick connect nipple 1043 which connects to a quick connect female receiver 1045 which is connected to a compressed air supply hose 1047 which provides compressed air from a compressed air source 1149. Manifold 1039 has an integral two-position three-way ball valve operated by lever 1040. Manifold 1039 is connected to an air muffler 1093 by conduit 1094 when the valve of manifold 1039 is open.

Leg support assembly 1021 is a single support welded to the main frame half way between both sides at the front of the apparatus 1001 and has a pivot and pin assembly to hold a second air ram 1200 at its lower end. Second air ram 1200 is fixed at its top end at a pivot pin assembly 1211 which is affixed to a top support 1201 which is affixed by rivets to plate 1011. Second air ram 1200 is connected to leg 1021 at a pivot pin 1213.

Second air ram 1200 has a compressed air supply tee connector 1205, which at one end is connected to a two-position on/off ball valve, and at the other end a hose 1208 which is connected to a compressed air regulator 1206 which has an adjustment knob 1215 connectable to quick connect 1045 to communicate with compressed air supply 1149.

A fresh fluid hose 1033 connects a fresh fluid supply connector 1031 to a fresh fluid manifold assembly 1049. A used fluid hose 1027 connects a used fluid receiver connector 1023 to a used fluid manifold assembly 1055.

Used fluid manifold assembly 1055 is connected to a black used fluid receiver hose 1063 which is connected to a quick connect female receiver 1065 and has a sightglass 1217 interposed to it at used manifold 1055. Quick connect 1065 connects to adapter 1099 which connect to the outlet side of the opened cooling circuit of the transmission. A pressure gauge 1016 is connected to manifold 1055. Manifold 1055 has a conduit 1057 which connects to a quick connect nipple 1059 which is connectable to a quick connect female receiver 1069. Quick connect 1069 is connected to transparent plastic used fluid delivery hose 1074 which is insertable in a used fluid bucket 1083.

Fresh fluid manifold assembly 1049 is connected to a red fresh fluid supply hose 1073 which is connected to a quick connect female receiver 1067. Quick connect 1067 connects to adapter 1097 which connect to the return side of the opened cooling circuit of the transmission. A pressure gauge 1018 is connected to manifold 1049. Manifold 1049 has a conduit 1051 which connects to a quick connect nipple 1053 which is connectable to a quick connect female receiver 1071. Quick connect 1071 is connected to transparent plastic used fluid suction hose 1075 which is insertable in a fresh fluid bucket 1081 which contains fresh fluid supply 1085.

Referring to FIG. 2, structure 1003 is depicted filled with fresh fluid and structure 1005 is emptied of used and diluted used fluid. This procedure is performed by connecting fresh fluid suction hose 1075 to the fresh fluid manifold 1049, and by connecting used fluid delivery hose 1074 to the used fluid manifold 1055. The compressed air supply hose 1042 is connected to compressed air manifold 1039 and lever 1040 is moved from its first off to position which is a venting position for main air ram 1035 to its on position which fills the ram with compressed air. This lengthens the ram and forces both the fresh fluid supply structure 1003 and the used fluid receiver structure 1005 to collapse to their limit forcing almost all their fluid out. The fluid exchange may be advantageously stopped before all the fresh fluid capacity is used and the operator may empty the remaining fresh fluid out in order to refill it with a different type of ATF. The operator may remove used delivery hose 1074 and switch fresh fluid suction hose 1075 to a bucket 1085 which contains the type of fresh fluid desired, in this case fresh fluid supply 1085. The operator then moves lever 1040 to its off position which block the compressed air and vents main air ram 1035 through muffler 1093. This causes the bilateral, dual spring assembly 1004 to force main air ram 1035 to its closed position and to separate plate 1013 to its maximum allowed distance from plate 1011. Nipple 1059 is uncoupled and closed, preventing the used fluid receiver structure 1005 from expanding. As plate 1013 travels upward to its maximum travel, fresh fluid is sucked into hose 1075 to be delivered to fresh fluid supply structure 1003. As soon at the maximum travel is reached, the operator removes the fresh suction hose 1075.

The operator may use an alternate method to fill the device with fresh fluid while simultaneously emptying it of used and diluted used fluid. The operator may connect hose 1074 to communicate with the used fluid receiver 1005 by connecting quick connect female receiver 1069 to quick connect nipple 1059, with hose 1074 in bucket 1083 while connecting a forced feed fresh fluid supply hose from a bulk supply source at quick connect nipple 1053 and keeping it connected until support plate 1011 is lowered to its lowest possible position with nipple 1207 open. This immediately empties the used fluid receiver structure 1005 of used and diluted used fluid while simultaneously filling the fresh fluid supply structure 1003 with fresh fluid.

The apparatus is now ready to interconnect to the cooling circuit of the transmission of a vehicle by opening the cooling circuit and installing a male adapter 1097 to the outlet side of the cooling circuit and installing a female adapter 1099 to the return side of the cooling circuit. Adapters 1097, 1099 are in turn connected to quick connect female receivers 1067 and 1065 respectively. The operator then moves adjustment knob 1215 of air compressor regulator 1206 to its off setting and connects quick connect female receiver 1045 to nipple 1207 to provide compressed air to second air ram 1200 as soon as the operator adjusts the regulator to a setting which communicates compressed air to second air ram 1200.

The operator then starts the engine of the vehicle to render the transmission operative to circulate fluid into its cooling circuit under pressure of its internal pump. The operator monitors pressure gauges 1016, 1018 and adjusts knob 1204 of regulator 1206, increasing the compressed air pressure on the second air ram 1200 until gauge 1018 is approximately equal to or is greater than gauge 1016. This provides additional pressure to the fresh fluid supply without increasing the resistance on the internal pump of the transmission, and reduces the resistance applied by the apparatus to that internal pump of the transmission.

If the operator recognizes that the fluid being pumped out of the transmission appears to display the clarity of fresh fluid, the operator may turn off air regulator 1206 and turn off the engine of the vehicle to render the transmission inoperative. Or the operator may allow the apparatus to exhaust almost all of its fresh fluid capacity by stopping the engine of the vehicle as soon as plate 1011 nears the end of its travel upward when the fresh fluid supply structure 1003 is approximately empty. At this point the apparatus is filled with used and diluted used fluid in structure 1005 and structure 1003 is approximately empty of fresh fluid. The operator then disconnects hoses 1063 and 1073 from adapters 1099 and 1097, and disconnects adapters 1099 and 1097 from the cooling circuit of the transmission. The operator then reconnects the cooling circuit of the transmission and the fluid exchange has been completed.

The accordion style dual structure assembly may have a pivot axis at one edge and have a different kind of dual, pleated accordion style set of dual diaphragms. The powering mechanism of the ram may be substituted with a turn-screw, auger/gear drive type system driven by generally any kind of motor, preferably a variable speed electric motor.

Other substitutions for embodiment components are possible using numerous mechanical means to power the movement of a divider structure dividing two reservoirs, such as piston-type, piston-type derivatives and various accordion styles.

The present invention may be modified to feature a piston type ram with a sealed rod penetrating the end of the cylinder guide of the piston. This rod may be connected to various powering means such as an air ram of FIG. 2, or a turn-screw auger/gear type powered by any kind of a motor, preferably a variable speed electric motor. Or the piston movement could be enhanced by use of a hydraulic powered ram with a small hydraulic pump powered by compressed air or electricity providing the hydraulic power. Also, a diaphragm within a pressure holding vessel could have a reinforced, inflexible center fixed to a sealed rod which penetrates the end of the vessel perpendicular to the diaphragm attachment plane. This rod may be powered with a multitude of means such as turn-screw auger/gear type drives powered by electric, compressed air or hydraulic motors or rack and pinion type drive type mechanisms. Any of these mechanisms may be used to extend the diaphragm in/and or out in order to move the diaphragm. In this way it may augment the power of the internal pump of the transmission, or may be used to fill and empty the device of both fresh and used fluids singly or in combination.

The above described embodiments of the invention are merely descriptive of its principles and are not to be considered limiting. Further modifications of the invention herein disclosed will occur to those skilled in the respective arts and all such modifications are deemed to be within the scope of the invention as defined by the following claims.

What is claimed is:

1. A fluid changing apparatus comprising:

a frame;

a first structure coupled to the frame with an at least partially flexible outer wall system defining a first vessel, the first vessel adapted to contain one or more fluids and be expandable and compressible to one or more states dependent on a volume of one or more fluids in the first vessel, a first end of the first structure being coupled to a portion of the frame;

a second structure coupled to the frame with an at least partially flexible outer wall system defining a second vessel, the second vessel adapted to contain one or more fluids and be expandable and compressible to one or more states dependent on a volume of one or more fluids in the second vessel, a second end of the second structure being coupled to a different portion of the frame, wherein a distance between the first end of the first structure and the second end of the second structure is adapted to be adjustable;

a first conduit assembly for communication of a first fluid to or from one of the first structure and the second structure;

a second conduit assembly for communication of a second fluid to or from the other of the first structure and the second structure; and a powered device operatively coupled to either the first structure or the second structure, wherein during operation of the fluid changing apparatus, a change in a volume of fluid in one of the first structure and the second structure corresponds to an opposite change in a volume of fluid in the other of the first structure and the second structure, and said change in volume in one of the first structure and the second structure being augmented by the powered device applied in addition to a pressure provided by an incoming fluid into the first structure to thereby increase a rate of the fluid exchange.

2. The fluid changing apparatus of claim 1 further comprising a frame wherein the first structure and the second structure form an assembly and are further operatively connected to the frame.

3. The fluid changing apparatus of claim 1 wherein a first end of the first structure and a second end of the second structure are each connected to a separate portion of a frame to define a distance between the first end of the first structure and the second end of the second structure.

4. The fluid changing apparatus of claim 1 wherein a second end of the first structure and a first end of the second structure are substantially adjacent and separated by one or more members.

5. The fluid changing apparatus of claim 1 wherein the first structure and the second structure are operatively connected.

6. The fluid changing apparatus of claim 1 wherein the first structure and the second structure are adapted to contain a fluid under pressure.

7. The fluid changing apparatus of claim 1 wherein the first structure is for generally fresh fluid.

8. The fluid changing apparatus of claim 1 wherein the second structure is for generally used fluid.

9. The fluid changing apparatus of claim 1 further comprising a first volume of one or more fluids in the first structure and a second volume of one or more fluids in the second structure whereby a sum of the first volume of one or more fluids and the second volume of one or more fluids is about constant during operation of the fluid changing apparatus.

10. The fluid changing apparatus of claim 1 wherein the first structure and the second structure are accordion-like or bellow-like.

11. The fluid changing apparatus of claim 1 wherein the first structure and the second structure are substantially inflexible in a radial direction.

12. The fluid changing apparatus of claim 1 wherein the first structure and the second structure have a limited longitudinal displacement.

13. The fluid changing apparatus of claim 1 wherein the first structure and the second structure are limited to expansion and compression in substantially one longitudinal direction.

14. The fluid changing apparatus of claim 1 wherein the first structure and the second structure are made of a substantially flexible material adapted to contain fluid under pressure.

15. The fluid changing apparatus of claim 1 wherein the first structure and the second structure each are adapted to form variable shaped fluid containment vessels having a range of volumes.

16. The fluid changing apparatus of claim 1 wherein the first conduit assembly is adapted to carry generally fresh fluid from a generally fresh fluid structure to a transmission fluid circulation circuit.

17. The fluid changing apparatus of claim 1 wherein the second conduit assembly is adapted to carry used fluid from a transmission fluid circulation circuit to a used fluid structure.

18. The fluid changing apparatus of claim 1 wherein a volume of fluid introduced into a circuit from the first structure is about equal to the volume of fluid introduced into the second structure from the circuit.

19. A fluid changing apparatus comprising:

a frame;

a first structure coupled to the frame with an at least partially flexible outer wall forming a first vessel adapted to have a range of volumes, the first structure adapted to expand to one or more states when filled with one or more fluids and adapted to compress to one or more states when one or more fluids are removed, a first end of the first structure being connected to a portion of the frame;

a second structure coupled to the frame with an at least partially flexible outer wall forming a second vessel adapted to have a range of volumes, the second structure adapted to expand to one or more states when filled with one or more fluids and adapted to compress to one or more states one or more fluids are removed, a second end of the second structure being connected to a different portion of a frame, wherein a distance between the first end of the first structure and the second end of the second structure is adapted to be adjustable; and a powered device operatively coupled to either the first structure or the second structure, wherein the first structure and the second structure operatively cooperate with one another such that a change in a volume of the first vessel is proportional to a change in a volume of the second vessel, and said change in volume in one of the first structure and the second structure being augmented by the powered device applied in addition to a pressure provided by an incoming fluid into the first structure to thereby increase a rate of the fluid exchange.

* * * * *